United States Patent Office 2,746,155
Patented May 22, 1956

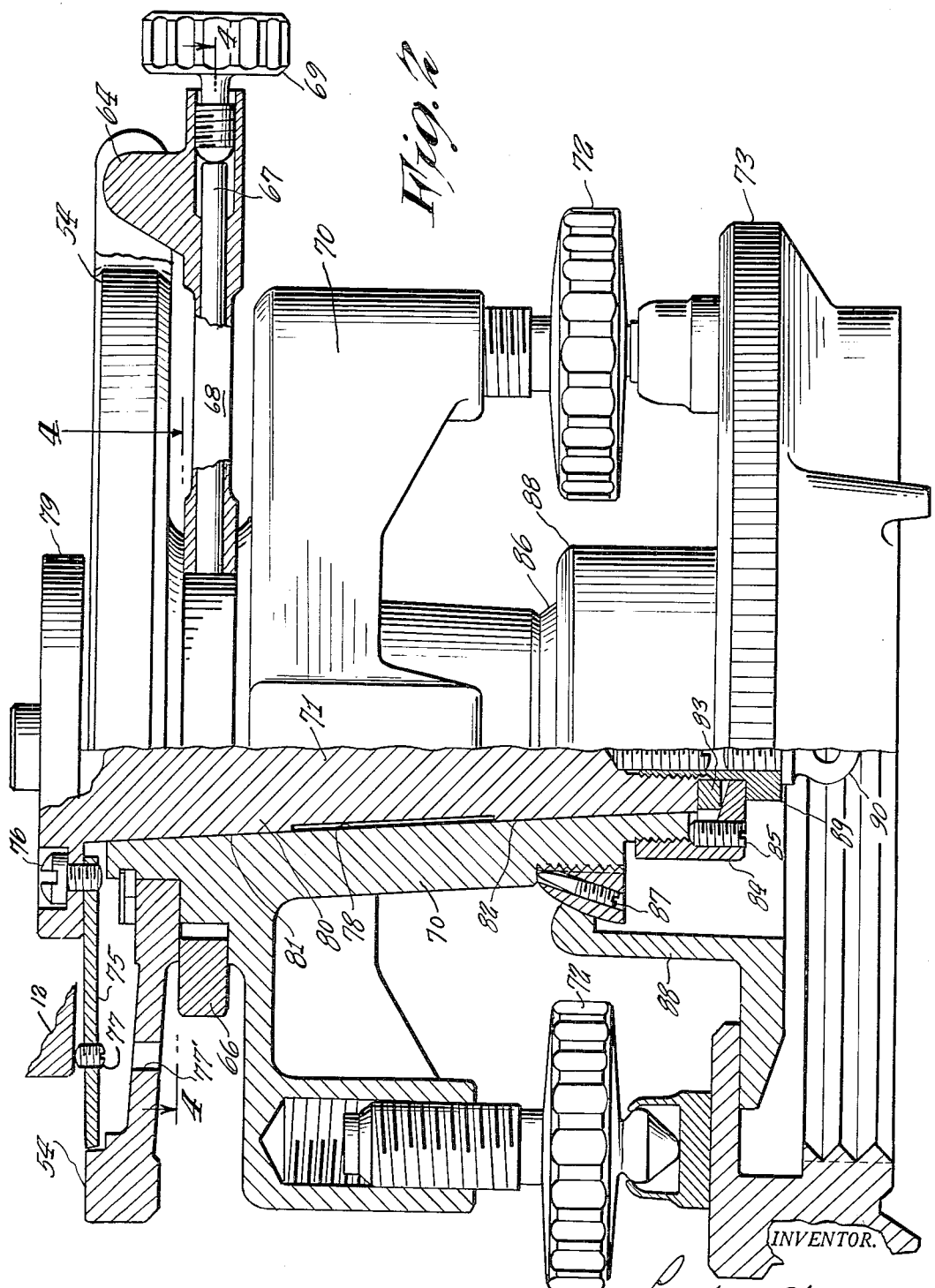

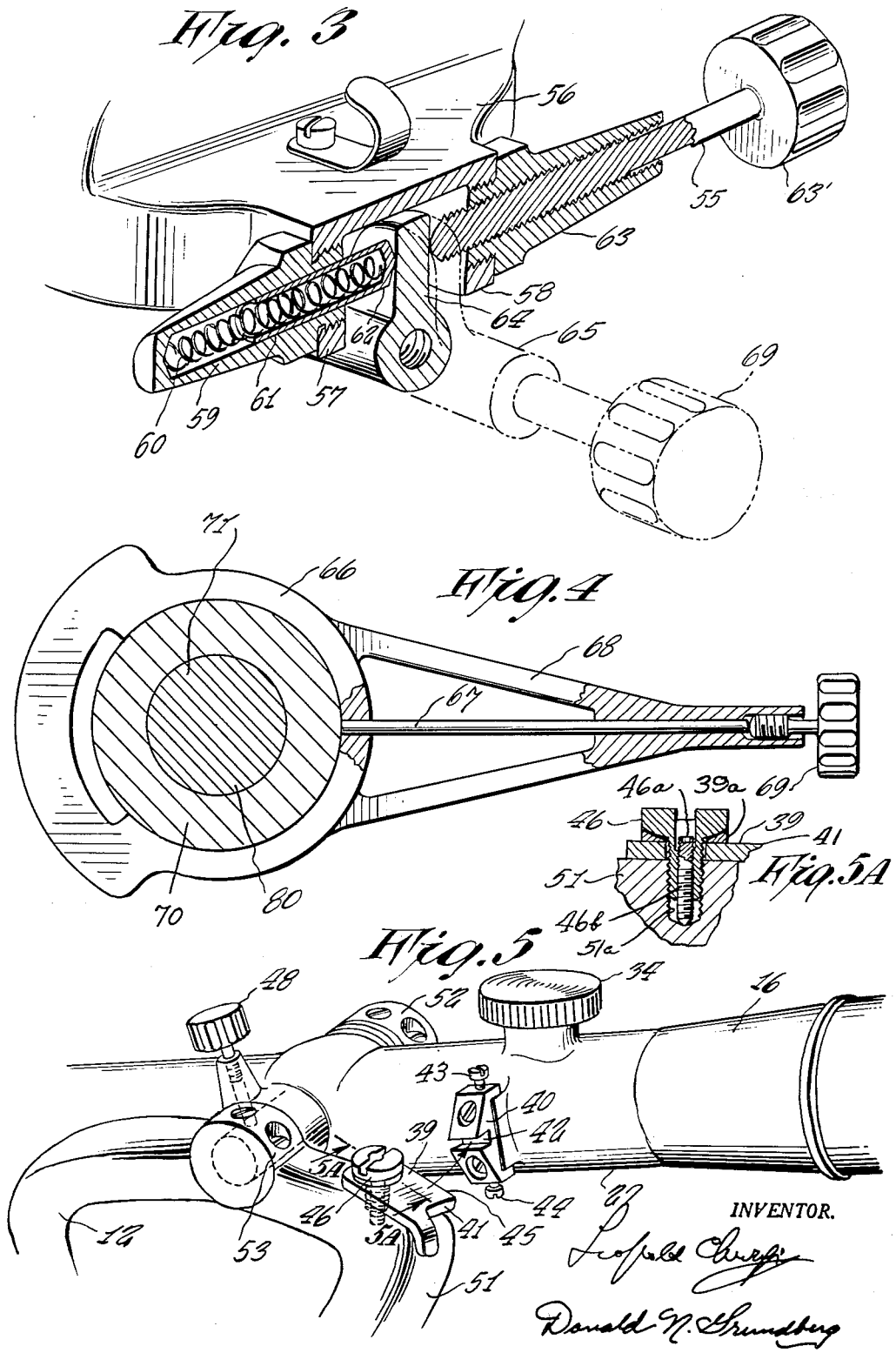

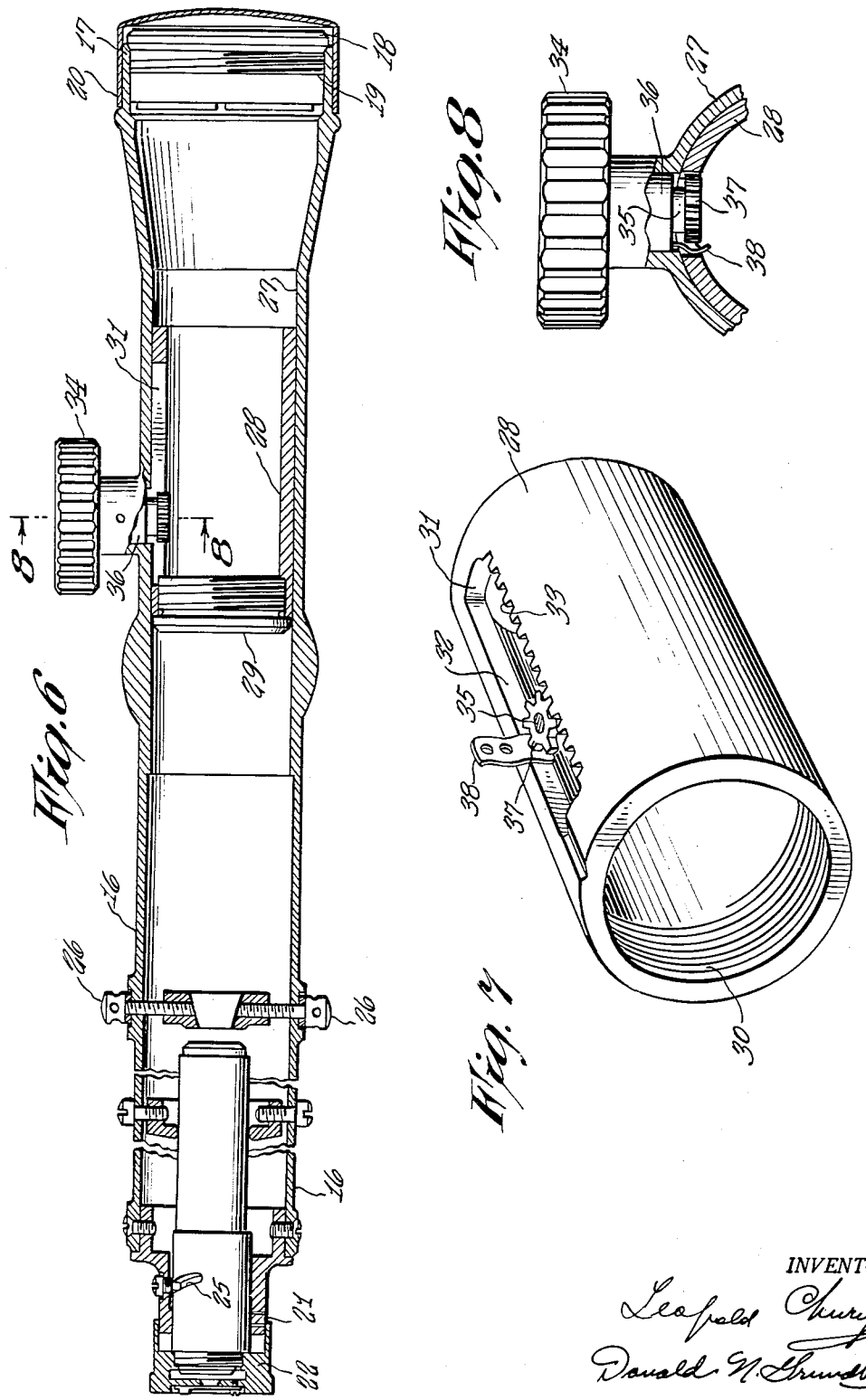

2,746,155
PRECISION SURVEYING INSTRUMENT

Leopold Churgin, New York, N. Y., and Donald N. Grundberg, Stoneham, Mass., assignors to C. L. Berger & Sons, Inc., Boston, Mass., a corporation of Massachusetts Application January 24, 1952, Serial No. 268,061

1 Claim. (Cl. 33—69)

This invention relates generally to surveying instruments, and more particularly to an improved form of transit-level. The invention lies in improved structural features which not only provide for easier operation on the part of the user, but simplified manufacture of the device with a resultant saving in the cost of manufacture as well.

It is among the principal objects of the present invention to provide a transit-level of the type described in which the center spindle which forms the vertical axis of the instrument may be fitted to a much wider tolerance or clearance than has heretofore been the practice in instruments of the above mentioned type, without resultant loss in accuracy.

A further object of the invention lies in the provision of surveying instrument structure in which the cost of fabrication may be of a relatively low order, with consequent wide sale, distribution and use.

A further object of the invention lies in the provision of horizontal circle vernier plate adjustment means by means of which the vernier plate may be aligned to the same plane as the horizontal circle. Should disalignment occur, the same may be realigned by use of the same means without disassembling the instrument.

A feature of the invention lies in the fact that the inventive structure possesses substantially all of the adjustments and capabilities of far higher-priced instruments, and is capable of making measurements to a degree of precision approximating that of higher-priced instruments.

Another feature of the invention lies in the fact that owing to novel cage supporting structure, the device is far less susceptible to damage than is the case of conventional surveying instruments.

These objects and features, as well as other incidental ends and advantages, will become more clearly apparent during the course of the following disclosure, and be pointed out in the appended claim.

On the drawings, to which reference will be made in the specification, similar reference characters have been employed to designate corresponding parts throughout the several views.

Figure 2 is an enlarged fargmentary vertical central sectional view as seen from the plane 2—2 on Figure 1.

Figure 3 is an enlarged fragmentary view in perspective, partly in section, showing the improved means for adjusting the horizontal circle.

Figure 4 is a horizontal sectional view as seen from the plane 4—4 on Figure 2.

Figure 5 is a view in perspective showing the improved means for locking the telescope in a horizontal position about the horizontal axis, and Fig. 5A is section from 5A—5A.

Figure 6 is a fragmentary enlarged vertical longitudinal sectional view as seen from the plane 6—6 on Figure 1.

Figure 7 is an enlarged fragmentary view in perspective of the focusing tube, together with the novel means for adjusting the same.

Figure 8 is an enlarged fragmentary vertical sectional view, partly in elevation, as seen from the plane 8—8 on Figure 6.

Figure 1:
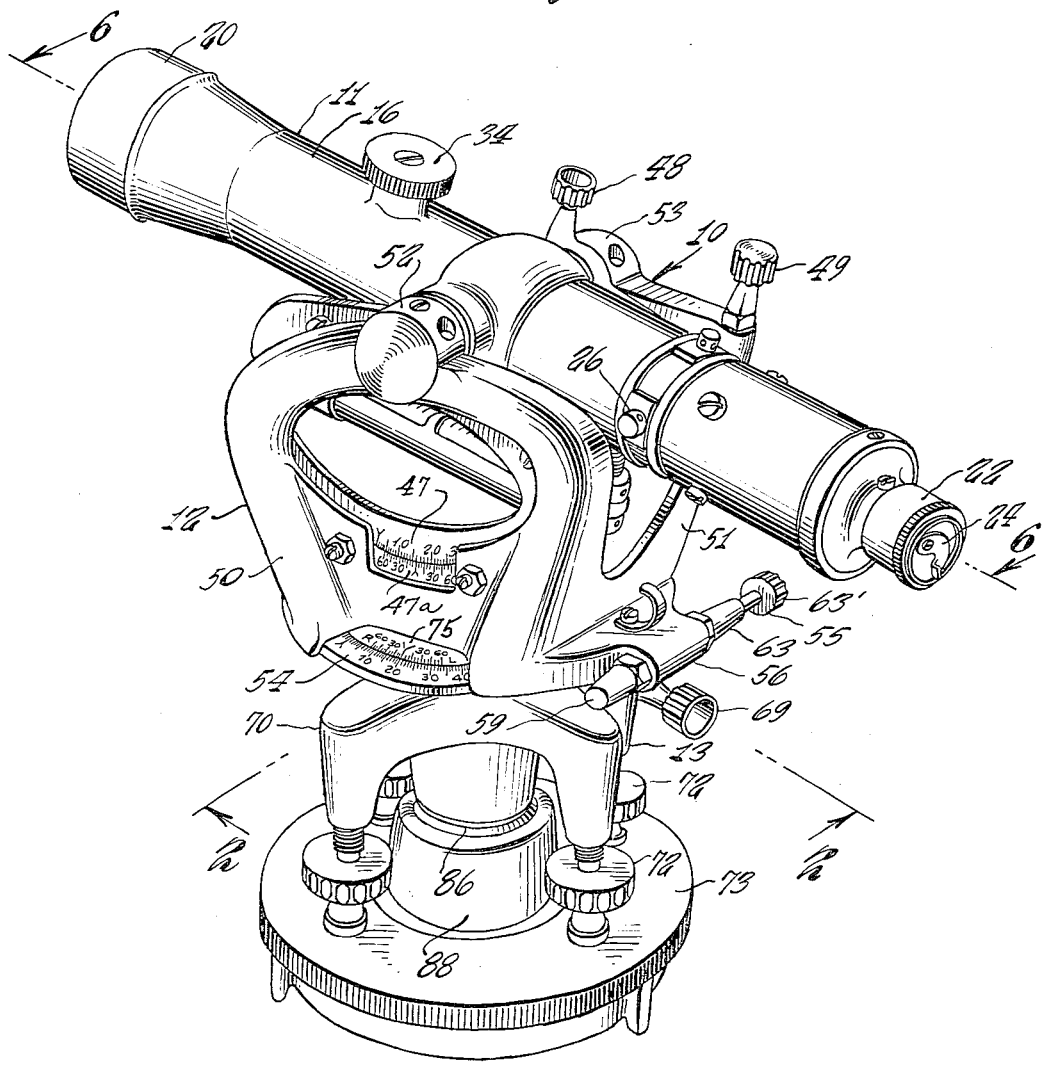
Figure 1 is a view in perspective of an embodiment of the invention.

In accordance with the invention, the device, generally indicated by reference character 10, comprises broadly: a telescope 11, a telescope cage element 12 and a leveling head element 13.

The telescope element 11 includes a telescope barrel 16, having a forward end in which there is disposed the objective lens 18, the same being secured to the barrel 16 by means of threads 19. A protective cap 20 may be positioned over the lens 18 when the device is not in use. Disposed at the opposite end 21 is an eye piece assembly 22 having disposed therein a convex eye piece lens (not shown), the same being protected by a pivotally mounted cover 24 when not in use. A spiral groove 25 permits the assembly 22 to be advanced or retracted as required to permit the same to be focused upon the crosshair assembly 26.

Disposed within a cylindrically bored portion 27 of the telescope barrel 16 is a focusing tube having mounted at the rearwardly disposed end thereof a negative lens mount 29. The mount is preferably engaged with the tube 28 by means of threads 30, although, if desired, other means may be employed.

Extending through the top portion of the tube 28 is a slot 31 of elongated configuration (see Figure 7). One of the longer sides 32 of the slot 31 is a smooth planar surface normal to the outer surface of the tube. The opposite side of the slot is in the form of a toothed rack 33. Disposed above the telescope tube 16 is a focusing knob 34 which drives a shaft 35 in a bearing or collar 36, the bearing being supported within a vertical extension of the barrel 16. A pinion 37 is mounted on the inner end of shaft 35, the same meshing with the teeth on the rack 33. A leaf spring 38 is mounted on the bearing 36, the lowermost portion of which contacts the surface 32. Thus, because the barrel 28 is free to turn through a small angle against the resilient action of the spring 38, the engagement of the pinion 37 with the rack 33 is cushioned through the spring to provide smoothness during focusing. The rack 33 is cut directly into the focusing tube 28 being integral therewith, and resulting in a simple compact construction.

Referring to Figures 5 and 5A of the accompanying drawings, there may be seen the structure of the telescope lock 39 which fixes relative movement between the telescope element and particularly the barrel 16 and the telescope cage element 12, about the horizontal axis in such manner that the scale on the vertical circle will read zero or other predetermined degree. As mentioned hereinabove, this structure when locked immediately converts the transit into a simple level of the type normally employed in determining differences in elevation between several points. As the telescope is provided with the usual level tube (Fig. 1) and the cage element is provided with a smaller bubble tube disposed at right angles thereto (not shown), it is possible when shifting the device from station to station to level the same, using the two above mentioned bubble tubes in conjunction with each other. Since the axes of the same are already disposed at right angles with respect to each other, it is not necessary to rotate the telescope element and cage element as a unit about the vertical axis through 90° as is the case in the conventional level where the entire leveling operation is accomplished by the use of the telescope bubble alone.

The locking structure includes an adjustable member 40 located on the telescope barrel 16 and a pivotally mounted member 41 secured to the telescope cage element 12. The adjustable member 40 is provided with a slot 42 as well as adjusting screws 43 and 44 which serve to adjust the slot 42 with respect to the edge 45 of the member 41. The initial adjustment is normally made so that the edge 45 will enter the slot when the vertical circle reads zero. The member 41 is usually allowed to remain in the position shown on Figure 5 when stadia work is done, and is moved in the direction of the arrow to engage the slot 42 when it is desired to transform the device into a level. The pivotal screw 46 is provided with adjustment means (see Fig. 5A) whereby the screw 46 penetrates the self aligning washer 39a and has a threaded central bore 46b with a socket head set screw 46a which butts against the bottom of the bore 51a to fix the adjustment of the screw 46.

The vertical circle 47 is of generally conventional arrangement and may coact with a vernier plate 47a. There is also provided a horizontal axis lock 48 to be used in conjunction with a fine adjusting screw 49.

The telescope cage element 12 includes a pair of cage supports 50 and 51 on the uppermost portion of which there are provided the horizontal axis bearings 52 and 53. The telescope is suspended on these bearings in a well known manner.

The relatively stationary horizontal circle 54 is mounted in position beneath the cage element 12, the adjusting means therefor being integral with said cage element. As may be seen on Figures 1 and 3, the means 55 includes a bracket 56 which is formed integrally with the cage element 12. A pair of threaded flanges 57 and 58 extend outwardly at right angles with respect to the bracket 56 to be engaged with a cap nut 59 and a threaded collar 63. The cap nut 59 is provided with a tubular recess in which are disposed a spring 60 and a tube 61 having a pointed engaging terminal 62. The collar 63 accommodates an adjusting screw 63', which together with the terminal 62 engage a vertically disposed flange 64 which is a part of the vertical axis lock 65. By reversing the position of the members 59 and 63 in the flanges 57 and 58 the screw 63 may be positioned for operation by the opposite hand of the user.

The vertical axis lock 65 includes a locking collar 66 actuated by a push rod 67 in turn supported by a bracket 68, preferably formed in one piece with the locking collar 66. The rod 67 is made to bear against a portion of the leveling head 70 by means of a threaded tension screw 69.

The leveling head element 13 includes a leveling head 70 which accommodates the vertically disposed central spindle 71 which forms the vertical axis of the instrument. Four leveling head screws 72 bear against the upper surface of the foot plate 73, the last mentioned member being threadedly engageable with a tripod (not shown). The vernier plate 75 which serves to determine fine degrees of measurement on the horizontal circle 54 is formed from metal or other suitable material having a degree of resiliency. It is secured at the inner edge thereof to the central spindle 71 by means of a screw or screws 76. An adjusting screw 77 which bears against the under surface of the cage element 12 serves to align the plane of the upper surface of the vernier plate 75 with the plane of the horizontal circle 54, this screw being reached through an opening 77' in the horizontal circle supporting structure. Thus minor discrepancies in the fit of the central spindle 71 within the leveling head 70 are accommodated by rotating the adjusting screw 77 to secure accurate alignment between the vernier plate 75 and the vertical circle 54.

The conical bore 78 in the leveling head 70 forms a taper fit with the central spindle 71. As is the case in conventional instruments, the spindle 71 is provided with an upper flange 79 which extends radially with respect to the vertical axis of the instrument. In the case of expensive instruments of this type the fitting of the spindle within the bore has always been a painstaking operation requiring the highest precision. As is the case in all taper fits, a minuscule amount of grinding will remove a sufficient amount of material from the central spindle to allow the same to drop a considerable degree within the bore 78. In the present structure, it is possible to fit the central spindle 71 to much greater tolerances with respect to the bore 78 than has heretofore been possible. It is to be understood that this fit must still be sufficiently accurate to assure proper precise functioning of the instrument. Nevertheless, the tolerances may be considerably greater than has heretofore been the practice in the manufacturing of similar instruments.

In accordance with this improved structure, the central spindle 71 includes an upper fitted area 81 and a lower fitted area 82, which areas contact the bore 78. Disposed at the bottom surface of the spindle 71 is a thrust washer 83 which supports the vertical load exerted by the spindle 71. The thrust washer 83 is in turn supported by a washer housing 84 which is threadedly engaged with the lowermost portion of the leveling head 70. Since the thrust washer 83 is raised or lowered with respect to the bore 78 by the rotation of the housing 84, it is apparent that minor discrepancies in the fit are accommodated by this adjustment. When the desired adjustment has been secured after fitting, the housing 84 may be locked in position by means of a set screw 85 which bears against a horizontally disposed surface at the lower portion of the leveling head 70.

When setting the central spindle 71 into the bore 78, the same is allowed to rest upon the washer 83, the washer being raised and lowered by means of the housing 84 until frictional contacts between the fitted areas 81 and 82 and the bore 78 are minimized without permitting the spindle to wobble. At this point the set screw 85 is tightened to maintain the proper adjustment.

The ball nut 86 is of conventional construction, being threadedly engaged with the leveling head 70 and maintained in position by a set screw 87. The upper surface of the ball nut 86 contacts the shifting piece 88 in the usual manner to permit the entire device to be leveled by means of the screws 72.

The spindle 71 is maintained in position by means of a spindle locking nut 89 within the center of which the plumb bob ring 90 is mounted.

It may thus be seen that there has been provided novel and highly useful improvements in surveying instrument structure which permit the same to be manufactured at a decreased cost when compared with conventional type instruments. Owing to the provision of an adjustable thrust washer disposed at the lowermost terminal of the central spindle, the fitting of the spindle within the bore of the leveling head is greatly simplified. Small discrepancies in the fitting are accommodated by an adjustable horizontal circle vernier plate which may be raised and lowered to correspond to the level of the horizontal circle itself. With the above simplicity of structure, it is possible to manufacture a durable instrument having a relatively long trouble-free useful life at a very reasonable price, thus permitting the use of a precision instrument where heretofore only instruments of considerably less precision have been employed.

It is to be understood that it is not considered that the invention is limted to the exact details of srtucture shown and set forth in this specification, for obvious modifications will occur to those skilled in the art to which the present invention pertains.

What is claimed is:

Surveying instrument structure comprising: a leveling head; a horizontal measuring circle mounted upon said leveling head; said leveling head having a conically shaped bore extending therethrough, said bore having a substantially vertically disposed axis; a telescope support element having a tapered vertical spindle engageable with said bore, said spindle having an upper fitted area in the form of a frustum of a cone; and a lower fitted area in the shape of a second frustum of a cone; a vernier plate upon said spindle aligned with said horizontal measuring circle; means for adjusting the fit between said bore and said upper and lower fitted areas, and means for adjusting the alignment of said verner plate with respect to said horizontal measuring circle; said means for adjusting the fit of said fitted areas of said spindle with respect to said bore including a thrust bearing in the form of an annular washer disposed beneath said spindle, a housing surrounding said washer and threadedly engageable with a lower portion of said leveling head whereby said washer may be adjusted axially with respect to the axis of said spindle; means in the form of a locking screw to fix a given adjustment of said housing with respect to said leveling head; said spindle having a threaded bore axially disposed in the lower portion thereof, and a spindle locking nut having a threaded shaft portion adapted to project through said annular washer to engage said bore, and a headed portion engageable with said housing; whereby said spindle is maintained in positive contact with the annular upper area of said washer.

References Cited in the file of this patent

UNITED STATES PATENTS

| Number | Name | Date |
|---|---|---|
| 184,922 | Spofford | Nov. 28, 1876 |
| 325,070 | Gardam | Aug. 25, 1885 |
| 720,844 | Rafferty | Feb. 17, 1903 |
| 846,989 | Ferber | Mar. 12, 1907 |
| 879,605 | Young | Feb. 18, 1908 |
| 1,010,339 | Angel | Nov. 28, 1911 |
| 1,132,236 | Ainsworth | Mar. 16, 1915 |
| 1,167,164 | Grebe | Jan. 4, 1916 |
| 1,300,047 | Thomas | Apr. 8, 1919 |
| 1,710,057 | Heinrich | Apr. 23, 1929 |
| 1,777,853 | Mahler | Oct. 7, 1930 |
| 1,882,523 | Rothweiler | Oct. 11, 1932 |
| 2,104,151 | Brisbane et al. | Jan. 4, 1938 |
| 2,238,118 | Langsner | Apr. 15, 1941 |
| 2,280,057 | Brunson | Apr. 21, 1942 |
| 2,338,271 | Ulanet | Jan. 4, 1944 |
| 2,408,343 | Rothweiler | Sept. 24, 1946 |
| 2,607,994 | Keuffel | Aug. 26, 1952 |